W. S. BULLARD.
COASTER BRAKE.
APPLICATION FILED OCT. 10, 1913.
1,193,355.
Patented Aug. 1, 1916.
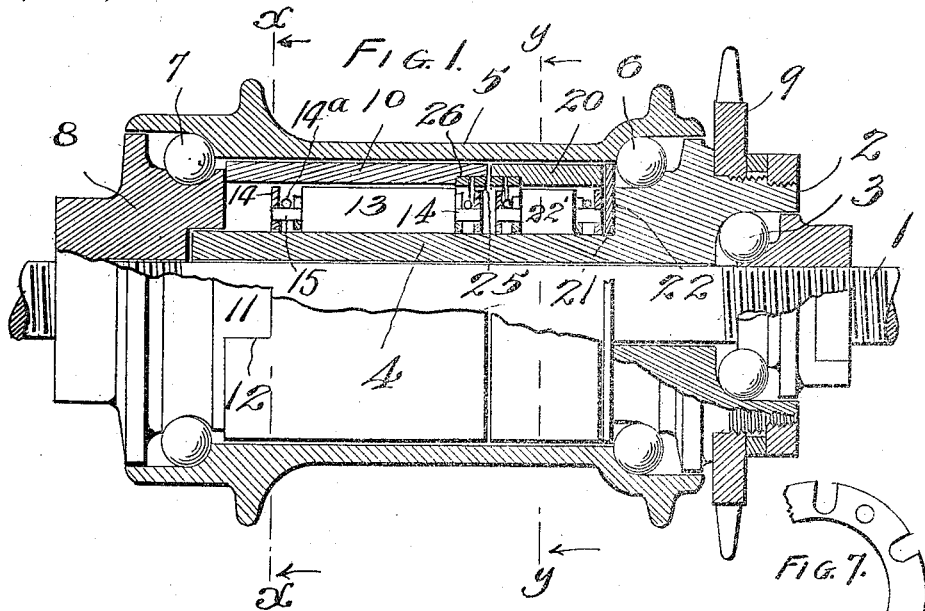
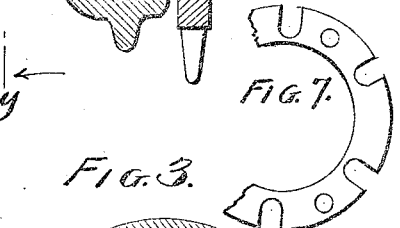
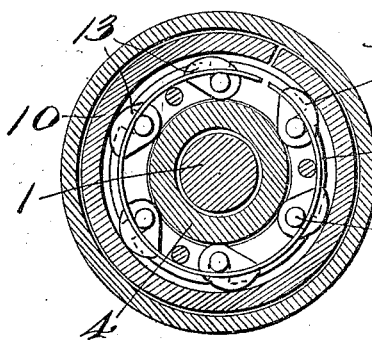
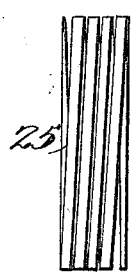
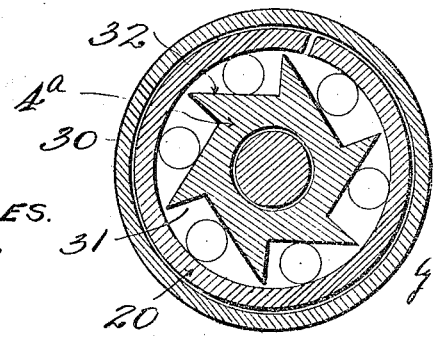
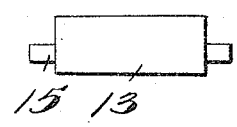
WITNESSES.
C. K. Davies
W. B. Brock
INVENTOR
W. S. Bullard
Brody, Ruben Smith
Attorneys

UNITED STATES PATENT OFFICE.

WALTER S. BULLARD, OF MIDDLETOWN, OHIO.

COASTER-BRAKE.

1,193,355.

Specification of Letters Patent.

Patented Aug. 1, 1916.

Application filed October 10, 1913. Serial No. 794,436.

*To all whom it may concern:*

Be it known that I, WALTER S. BULLARD, a citizen of the United States, residing at Middletown, Ohio, have invented certain new and useful Improvements in Coaster-Brakes for bicycles and the like, of which the following is a specification.

The object of the invention is to provide a very simple structure in which the parts are cheaply made, and which has positive and adequate driving and braking actions.

The accompanying drawing shows one exemplifying structure embodying the invention, with one modification thereof, but it is to be understood that the invention is capable of embodiment in many different forms, and I do not limit myself to the specific construction and arrangement of parts as shown.

Figure 1 is a longitudinal section through a coaster hub embodying the invention. Fig. 2 is a vertical section on the line $x-x$ of Fig. 1. Fig. 3 is a similar section on the line $y-y$ of Fig. 1. Fig. 4 is a side view of a spring retarder. Fig. 5 is a side view of one of the clutch rollers or connectors. Fig. 6 is a vertical section through a modified form of clutch sleeve and driver. Fig. 7 is a fragmentary end view of one of the roller cages.

Reference character 1 designates the usual stationary axle to be secured in the fork ends of a bicycle or similar vehicle. Upon this, driver 2 is mounted on ball bearing 3. The driver has a sleeve 4 extending along the axle. At one end, the wheel hub 5 is supported upon the driver on ball bearing 6, and at the other end the hub is supported by balls 7 upon a bearing member 8 carried by the axle. This bearing member 8, in a preferred construction, also serves as a brake holder, and for this purpose is provided with any suitable means by which it engages the axle, fork end, or other adjacent part of the vehicle frame, and is prevented from rotating.

The driver 2 carries the usual sprocket 9 or other suitable means for rotating the driver forward or backward, in accordance with the direction of rotation of the driving pedals or other driving means of the vehicle.

Within the hub is a brake sleeve, sometimes designated simply as the brake, 10. This sleeve is split longitudinally and is prevented from rotation by engaging the brake holder 8, a specific means provided for such purpose, consisting of a lug 11 on the brake holder engaging a recess 12 in the sleeve. Between the brake sleeve and driver sleeve 4 is brake-actuating mechanism for expanding the brake sleeve into engagement upon backward rotation of the driver. This mechanism in the specific embodiment shown consists of rollers or connectors 13 of cam-like cross-section, all located similarly between the brake sleeve and driver sleeve and so held by suitable cages 14. By this means the connector rollers are properly spaced apart. Between the flanges of the edges are located spring clips $14^a$ which engage pintles 15 and urge the connectors into engagement with sleeve 4. The pintles are accommodated in slots $14^b$ provided in cages 14, as seen in Figs. 1, 2, 3 and 7. By reason of the cam-like form of the connectors engaging the cylindrical inner and outer surfaces of the brake sleeve and driver sleeve, respectively, when the driver is rotated forward, the outer faces of the connectors are drawn away from the brake sleeve and the whole brake operating mechanism will revolve with the driver without appreciable friction; but when the driver is rotated backward, the outer faces of the cams first engage the brake sleeve and prevent rearward movement of the actuating mechanism, and immediately thereafter further movement of the driver sleeve causes the cam-like connectors to expand the brake sleeve into engagement with the hub, applying the braking force proportionate to the pressure exerted on the pedals or other controlling means.

Between the brake sleeve and the driver, is located driving sleeve or clutch 20. This is also split longitudinally. One end of this sleeve abuts against a washer 21, located against shoulder 22 on the driver. Between driving clutch sleeve 20 and driver sleeve 4, is drive operating mechanism, consisting specifically of drive rollers or connectors 22′, which may be of similar form to the brake connectors and held by similar cages, but in this case the position of the connectors is reversed, so that on forward movement of the driver the connectors engage between the driver sleeve 4 and the clutch sleeve 20 and expand the latter into engagement with the hub, and thus firmly grip the hub as long as driving pressure is exerted upon the driver. The initial clutching connection of sleeve 20 is insured by a retarder 25, which may be a spring, located in annular countersinks 26 in the brake sleeve and driving clutch sleeve. This spring, by expansion, serves to hold the driving clutch sleeve 20 with sufficient pressure to appreciably resist the first forward turning movement of the clutch sleeve, so that the first effort of the connectors 22' is directed to expanding the sleeve, whereupon it grips the hub, and the retarding effect of spring 25 is then immediately overcome and the sleeve rotates with the driver and hub practically as a unit.

When the driving pedals are held stationary, all parts are as shown in Fig. 1. The hub is, therefore, free to turn backward as well as forward when the cycle is rolled in the corresponding direction without any effect upon the driving pedals, since both brake sleeve 10 and driving clutch sleeve 20 are free from the hub and the movement of the hub has no effect upon the connecting mechanism.

Fig. 6 shows a modified form of driver sleeve and actuating mechanism for either the driving clutch or brake. Cylindrical connectors or rollers 30 may be used in connection with roller sockets 31, cut in the driver sleeve 4ª. These sockets have faces 32 inclined at such an angle that when the driver sleeve is moved to the right, as shown in Fig. 6, the corresponding driving clutch sleeve 20 is connected with the hub for driving. The same mechanism may be used for the brake by simply reversing the direction of the roller sockets 31 in the driver sleeve 4ª. For driving, the driver 2 is turned forward, that is the top moves away from the eye in Fig. 1. Driving rollers or cams 22' are thus moved forward by driver sleeve 4. The forward movement of driving clutch sleeve 20 is at first resisted by retarder spring 25. This retardation of sleeve 20 causes the rollers 22' to engage its inner surface and expand it, whereupon it grips hub 5 and drives it. To coast, driver 2 is held stationary, whereupon the forward rotation of the hub releases driver sleeve 20 from expanding action of rollers 22' and the wheel coasts freely. To apply the brake, the driver is moved backward, whereupon brake-actuating rollers 13 engage and expand brake sleeve 10. The brake is released by forward movement of the driver.

I claim:—

1. In a coaster brake, the combination of an axle, a driver, a hub, a brake holder, an expansible brake sleeve engaging the holder within the hub, an expansible drive clutch member within the hub, brake-operating means between the brake and driver to operate the brake upon reverse movement of the driver, driving-clutch operating-means between the driving clutch member and the driver to connect said clutch member with the hub upon forward movement of the driver, and a retarder for resisting forward rotation of said driving clutch member.

2. In a coaster brake, the combination of an axle, a driver having a sleeve extending along the axle, a wheel hub, a brake holder on the axle, an expansible brake sleeve within the hub engaging said brake holder, an expansible driving clutch sleeve within the hub, a retarder for resisting forward movement of said driving clutch sleeve, means comprising connectors intermediate the driver sleeve and brake and intermediate the driver sleeve and driving clutch member for expanding the brake upon rearward rotation of the driver and expanding the driving clutch member upon forward rotation of the driver, said hub being entirely free to rotate in either direction when the driver is held stationary.

3. In a coaster brake, the combination of an axle, a driver having a sleeve extending along the axle, a wheel hub, a brake holder on the axle, an expansible brake sleeve within the hub engaging said brake holder, an expansible driving clutch sleeve within the hub, a retarder for resisting forward movement of said driving clutch sleeve, cam-shaped connectors between said driver sleeve and brake sleeve arranged so that rearward movement of the driver expands said brake sleeve, and similar connectors between the driver sleeve and driving clutch sleeve arranged so that forward rotation of the driver expands said driving clutch sleeve.

4. In a coaster brake, the combination of an axle, a driver, a hub, a brake holder, a brake engaging the holder to prevent rotation of the brake, an expansible driving clutch sleeve within the hub, brake operating means between the brake and driver operate the brake upon reverse movement of the driver, driving clutch operating means between the driving clutch member and the driver to connect said clutch member with the hub upon forward movement of the driver, and a retarder to slightly resist forward rotation of said driving sleeve.

WALTER S. BULLARD.

Witnesses:
EDD. H. EDSON,
W. T. HARRISON.